(12) United States Patent
Chiou et al.

(10) Patent No.: US 7,662,307 B2
(45) Date of Patent: Feb. 16, 2010

(54) COMPOSITION FOR THERMAL INTERFACE MATERIAL

(75) Inventors: Kuo-Chan Chiou, Tainan (TW); Tzong-Ming Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 701 days.

(21) Appl. No.: 11/415,610

(22) Filed: May 1, 2006

(65) Prior Publication Data

US 2007/0161729 A1 Jul. 12, 2007

(30) Foreign Application Priority Data

Dec. 20, 2005 (TW) .............................. 94145218 A

(51) Int. Cl.
*C08K 5/07* (2006.01)
*C08K 3/04* (2006.01)

(52) U.S. Cl. ..................... 252/299.01; 349/1; 524/356

(58) Field of Classification Search ............ 252/299.01; 349/1; 524/356

See application file for complete search history.

(56) References Cited

U.S. PATENT DOCUMENTS

| 6,407,922 | B1 | 6/2002 | Eckblad et al. ............. 361/704 |
| 6,451,422 | B1 | 9/2002 | Nguyen ....................... 428/323 |
| 2003/0203181 | A1 | 10/2003 | Ellsworth, Jr. et al. ... 428/307.3 |
| 2004/0000661 | A1* | 1/2004 | Sato ........................ 252/299.01 |
| 2005/0150887 | A1 | 7/2005 | Taya et al. .................. 219/548 |
| 2005/0171269 | A1 | 8/2005 | Hu et al. ..................... 524/495 |

FOREIGN PATENT DOCUMENTS

| JP | 2004263043 A | * | 9/2004 |
| WO | WO 2004025761 A2 | * | 3/2004 |

* cited by examiner

*Primary Examiner*—Kelechi C Egwim
(74) *Attorney, Agent, or Firm*—J.C. Patents

(57) ABSTRACT

A composition for a thermal interface material is provided. The deficiencies of low thermal conductivity and high thermal resistance in the conventional thermal interface materials are resolved. The CNT-LC thermal composite structure is formed by using carbon nanotube with high thermal conductivity and liquid crystal polymer with the well-ordered structure. The thermal interface material thereby has a high thermal conductivity. The added amount of carbon nanotube is less than the added amount of metal or ceramic powders in the prior art for improving the dispersion process. The CNT-LC thermal composite structure and the phase change resin are compatible without phase separation. The thermal interface material has a phase change temperature about 45~75° C. Any holes, gaps and dents on the surface of device are filled at the normal operating temperature of device to reduce the thermal resistance of the entire device.

14 Claims, No Drawings

COMPOSITION FOR THERMAL INTERFACE MATERIAL

CROSS-REFERENCE TO RELATED APPLICATION

This application claims the priority benefit of Taiwan application Ser. No. 94145218, filed on Dec. 20, 2005. All disclosure of the Taiwan application is incorporated herein by reference.

BACKGROUND OF THE INVENTION

1. Field of the Invention

The present invention relates to a thermal management material for electronic devices. More particularly, the present invention relates to a composition of a thermal interface material.

2. Description of Related Art

As electronic products are being rapidly introduced to the market, not only these electronic products are desired to be light, thin, compact and small, they are required to be highly functional and to have high transmission speed and operation efficiency. Under operation, the various devices, such as a CPU, generate a great amount of heat, and the temperature of the devices increases correspondingly. As a result, the devices may become defective. Accordingly, the thermal dissipation capability of the product or the devices needs to be improved to maintain the efficiency thereof.

To dissipate the waste heat, a heat sink is normally disposed on the device, the discrete power or the logic integrated circuits. Accordingly, thermal interface materials play an important role in thermal management. To enhance the thermal communication between the device and the heat sink, thermal interface materials with the appropriate thermal conductivity and thermal resistance must be identified.

A typical thermal interface material is normally composed of a silicon resin, an aliphatic polymer, a low molecular polyester, an acrylic resin, wax or an epoxy type of phase change resin material. Metal or ceramic powders, such as aluminum nitride (AlN), boron nitride (BN), aluminum oxide ($Al_2O_3$), zinc oxide (ZnO) and artificial diamond are further added as the thermal conductive material.

In order for the thermal interface material to have the phase change characteristics, the base resin normally has a low molecular weight and a low melting point. However, this type of resin easily degrades under a repeated operation of the device, and the thermal stability of the resin becomes poor. Consequently, the contact area diminishes and the efficiency of thermal dissipation is greatly reduced.

Although metal or ceramic powders serving as the thermal conductive material have an acceptable thermal conductivity, the thermal conductivity of the thermal interface material is not significantly increased after the thermal conductive material is incorporated with the base resin. To increase the thermal conductivity of the thermal interface material, a large quantity of the metal or ceramic powders must be added (about 50 to 90 wt %). However, the increase of the amount of the thermal conductive material increases the interface thermal resistance, and the thermal dissipation efficiency of the entire packaged device is lower eventually. Consequently, the cost is increased. Accordingly, the conventional thermal interface material has a low thermal conductivity and a high thermal resistance.

SUMMARY OF THE INVENTION

The present invention provides a composition of a thermal interface material that has a high thermal conductivity and a phase change ordered structure.

The present invention also provides a composition of a thermal interface material, which can be applied to a heat sink of an electronic product used in computers, communication products and consumer electronics, and in the various industries, such as automobile, medical, aerospace and communication.

The present invention provides a composition of a thermal interface material, wherein the composition includes a thermoplastic resin, a liquid crystal polymer and a carbon nanotube. The percentage of the phase change thermoplastic resin in the thermal interface material is about 30 to 89 by weight, the percentage of the liquid crystal polymer by weight is about 10 to 50 weight percent and the percentage of the carbon nanotube is about 1 to 25 by weight.

In the above-mentioned thermal interface material composition, the melting point of the phase change thermoplastic resin is lower than 100° C. The thermoplastic resin includes, but not limited to, ethylene vinyl acetate, ethylene-vinyl acetate copolymer, polyvinyl chloride (PVC), rosin ester, polypropylene random copolymer, polyoxymethylene copolymer, polyolefin, polyamide, polycarbonate, polyester, ethylene vinyl acetate, polyvinyl acetate, polyimide, or a mixture thereof.

In the above-mentioned thermal interface material composition, the thermoplastic resin includes ethylene-vinyl acetate copolymer. The melting index of the ethylene-vinyl acetate copolymer is about 2 to 100 g/10 min. The content of vinyl acetate in the ethylene-vinyl acetate copolymer is about 30 to 50 weight percent.

In the above-mentioned thermal interface material composition, the liquid crystal polymer includes nematic liquid crystal polymer, smectic liquid crystal polymer or cholesteric liquid crystal polymer. The monomer unit of the liquid crystal polymer includes cholesterol benzoate. The molecular weight of the liquid crystal polymer is about 3000 to 50000 (g/mole).

The above thermal interface material composition, the carbon nanotube includes single wall carbon nanotube or multi wall carbon nanotube. The average diameter of the carbon nanotube is about 1 to 100 nm. The aspect (length/diameter) ratio of the carbon nanotube is about 5 to 10000.

The above thermal interface material composition further includes a solvent, such as toluene, xylene, or methyl ethyl ketone.

In the above thermal interface material composition, the percentage of the thermoplastic resin in the composition is about 30 to 84 by weight, while the percentage of the liquid crystal polymer in the composition is about 15 to 50 by weight and the percentage of the carbon nanotube is about 1 to 20 by weight.

In the thermal interface material composition of the present invention, the carbon nanotube with high thermal conductivity is applied to lower the added amount of the thermal conductive material in order to lower the contact thermal resistance of the thermal interface material.

Moreover, the addition of the liquid crystal polymer into the thermal interface material composition greatly lower the overall viscosity of the base resin. The dispersion process of the carbon nanotube is thereby improved to prevent the aggregation of the carbon nanotube, which may adversely affect the thermal conductivity and the mechanical properties of the thermal interface material.

Moreover, since the carbon nanotube-liquid crystal polymer composite structure and the phase change thermoplastic resin are compatible and with no phase separation. Further, the phase change temperature (PCT) of the thermal interface material formed therewith is about 45 to 75° C.; therefore, under a normal operation, holes, cracks and voids on the surface of the device are filled. As a result, the thermal resistance of the entire device is lowered to one tenth of the original thermal resistance. The low thermal conductivity and the high thermal resistance of the conventional thermal interface materials can be effectively improved.

Several exemplary embodiments of the invention will now be described in detail with reference to the accompanying drawings. It is to be understood that the foregoing general description and the following detailed description of preferred purposes, features, and merits are exemplary and explanatory towards the principles of the invention only and are not restrictive of the invention, as claimed.

DESCRIPTION OF THE PREFERRED EMBODIMENTS

Reference will now be made in detail to the present preferred embodiments of the invention. It is to be understood that both the foregoing general description and the following detailed description are exemplary, and are intended to provide further explanation of the invention as claimed.

The thermal interface material composition of the present invention primarily includes a thermoplastic resin, a liquid crystal polymer and a carbon nanotube as the thermal conductive material.

In the present invention, the phase change materials are a class of materials that exists in a solid state, a semisolid glassy state or a crystalline state at normal room temperature, for example, 25° C. These materials undergo a transition to a liquid state, a semi-liquid state or a viscous fluid state at a high temperature or in a high ambient temperature. The phase transition temperature of the phase change thermoplastic resin preferably falls within the operating temperatures of the device, for example, between 40 to 75° C. Moreover, the melting point of the phase change thermoplastic resin is preferably lower than 100° C.

The phase change thermoplastic resin of the present invention includes, but not limited to, ethylene vinyl acetate, ethylene-vinyl acetate copolymer, polyvinyl chloride, rosin ester, polyoxymethylene copolymers, polyolefin, polyamide, polycarbonate, polyester, ethylene vinyl acetate, polyvinylacetate, polyimide or a mixture thereof.

The carbon nanotube that serves as the conductive material is single wall or multi wall carbon nanotube. The average diameter of the carbon nanotube is about 1 to 100 nm, for example. The length/diameter (aspect) ratio of the carbon nanotube is about 5 to 10000, for example.

The liquid crystal polymer includes the nematic type liquid crystal polymer, the smectic type liquid crystal polymer or the cholesteric type liquid crystal polymer, for example. The monomer unit of the liquid crystal polymer is cholesterol benzoate. The molecular weight of the liquid crystal polymer is about 3000 to 50000 (g/mole). Since the longitudinal thermal conduction of the carbon nanotube is high while the crosswise thermal conduction is nil, the addition of liquid crystal polymer in the thermal interface material composition and the highly ordered micro-structure of the liquid crystal polymer allows the carbon nanotube to disperse and align in a particular direction. The thermal conductivity of the thermal interface material can thereby increase.

The thermal interface material composition of the present invention further includes a solvent, such as toluene, xylene or methyl ethyl ketone. The thermal interface material composition of the present invention may also include common additives such as a lubricant or a surfactant, a pacifying agent or an anti-forming agent, a chain extender, a tackifier, a pigment, a stabilizer, a flame retardant and an antioxidant.

In the thermal interface material composition of the present invention, the percentage of the phase change thermoplastic resin in the composition is about 30 to 89 by weight, and is preferably about 30 to 84 by weight. The percentage of the liquid crystal polymer is about 10 to 50 by weight, and is preferably about 15 to 50 by weight. The percentage of the carbon nanotube is about 1 to 20 by weight.

The fabrication of the thermal interface material composition of the present invention is discussed as follows. The phase change thermoplastic resin is first dissolved in a solvent. A liquid crystal polymer is then added to the thermoplastic resin solution and stirred. A carbon nanotube is further slowly added into the solution and the carbon nanotube uniformly and orderly aligns in the microstructure of the liquid crystal polymer.

The following embodiment and three comparative examples are used to illustrate the effects of the thermal interface material composition of the present invention. It is to be understood that the embodiment is presented by way of example and not by way of limitation. In the following embodiment and comparative examples 1 to 3, the phase change thermoplastic resin is selected to be ethylene-vinyl acetate copolymer, in which the melting index is about 60 to 800 g/10 min. The amount of vinyl acetate in the ethylene-vinyl acetate copolymer is about 25 to 45 weight percent. The liquid crystal polymer is manufactured by Merck & Co., Inc., (MJ05661 liquid crystal polymer). The carbon nanotube with a tube diameter of about 40 to 60 nm is provided by Seedchem Company PTY, Ltd., manufactured by Showa Denko. Aluminum oxide is manufactured by Showa Denko. The diameter of aluminum oxide is about 1.4 micron.

Embodiment 1

A one-liter, four-mouth glass reactor with a three-impeller stirrer is provided. About 600 g of a toluene solvent is added into the glass reactor. About 200 g of the phase change thermoplastic resin, the ethylene-vinyl acetate copolymer (Elvax® 40W, DuPont), is further added and stirred to dissolve. About 200 g of the liquid crystal polymer (MJ05561, Merck & Co., Ltd., Japan) is added and stirred in the resin solution. About 20 g of the carbon nanotube (MWNT, d=40 to 60 nm, Seedchem Company PTY, Ltd.) is slowly added to the solution while being stirred. After a uniform mixing at high speed for about 30 minutes, a composition of the thermal interface material is resulted, wherein the thermal interface material has an ordered phase change structure and a high thermal conductivity.

Comparative Example 1

A one-liter, four-mouth glass reactor with a three-impeller stirrer is provided. About 600 g of a toluene solvent is added into the glass reactor. About 200 g of the phase change thermoplastic resin, the ethylene vinyl acetate copolymer (Elvax® 40W, DuPont), is further added and stirred to dissolve. Under mixing, about 20 g of carbon nanotube (MWNT, d=40 to 60 nm, Seedchem Company PTY, Ltd.) is slowly added. A mixing at high speed is then conducted for about 30 minutes to obtain a composition of the thermal interface material.

Comparative Example 2

A one-liter, four-mouth glass reactor with a three-impeller stirrer is provided. About 600 g of a toluene solvent is added into the glass reactor. About 200 g of the phase change thermoplastic resin, the ethylene vinyl acetate copolymer (Elvax® 40W, DuPont), is further added and stirred to dissolve. A mixing at high speed is then conducted for about 30 minutes to obtain a composition of the thermal interface material.

Comparative Example 3

A one-liter, four mouth glass reactor with a three-impeller stirrer is provided. About 600 g of a toluene solvent is added into the glass reactor. About 200 g of the phase change thermoplastic resin, the ethylene vinyl acetate copolymer (Elvax® 40W, DuPont), is further added and stirred to dissolve. Under stirring, about 20 g of aluminum oxide ($Al_2O_3$, d=1.4 μm, Showa Denko Co.) is slowly added. After a mixing at high speed for about 30 minutes, a composition of the thermal interface material is obtained.

After the preparations for the thermal interface material compositions of embodiment 1 and comparative examples 1 to 3 are completed, physical analyses of these compositions are conducted. The physical analyses include the determinations of the thermal conductivity and the phase change temperature using differential scanning calorimetry (DSC). The compositions from Embodiment 1 and comparative examples 1 to 3 and the corresponding physical properties are summarized in Table 1.

of ingredients, the thermal conductivity of the thermal interface material composition of comparative example 1 is about 10 to 40 times of those of the compositions of comparative examples 2 and 3. These results suggest that the amount of carbon nanotube needs to be added is far less than the amount of metal or ceramic powders. The dispersion process is thereby improved.

Accordingly, the composition of the thermal interface material that includes carbon nanotube with a high thermal conductivity can lower the added amount of the thermal conductive material. However, since the carbon nanotube has longitudinal heat conduction and no crosswise heat conduction, the dispersion and the alignment of the carbon nanotube at a particular direction is promoted by the highly ordered microstructure of the liquid crystal polymer to raise the thermal conductivity of the thermal interface material.

Moreover, since the addition of the liquid crystal polymer in the composition of the thermal interface material significantly lower the viscosity of the entire base resin, the dispersion process of the carbon nanotube is effectively enhanced. The aggregation of the carbon nanotube, which may adversely affect the thermal conductivity and the mechanical properties, is thereby obviated. By controlling the microstructure, a new type of carbon nanotube-liquid crystal (CNT-LC) thermal conductive material matrix is prepared. The composition of the thermal interface material, which is manufactured with the new type of CNT-LC composite structure has a thermal conductivity of about 10 to 40 times higher than that of the conventional thermal interface material composition. Moreover, the added amount of carbon nanotube is far less than that of metal or ceramic powders in the prior art. Accordingly, the dispersion process is improved.

TABLE 1

|  | Ethylene-vinyl acetate copolymer | Liquid crystal polymer | Carbon nanotube | Aluminum oxide | Toluene | Phase Change Temperature (DSC ° C.) | Thermal Conductivity, K (W/m*° C.) |
|---|---|---|---|---|---|---|---|
| Embodiment 1 | 200 | 200 | 20 | — | 600 | 45~75 | 6.8 |
| Comparative eg 1 | 200 | — | 20 | — | 600 | 37~74 | 4.9 |
| Comparative eg 2 | 200 | — | — | — | 600 | 45~78 | 0.13 |
| Comparative eg 3 | 200 | — | — | 20 | 600 | 38~75 | 0.45 |

According on the results summarized in Table 1, the composition of the thermal interface material of Embodiment 1 has a higher thermal conductivity than those of Comparative examples 1 to 3.

Moreover, comparing the composition of the thermal interlace material of Embodiment 1 with that of the thermal interface material of Comparative example 1, the composition of Embodiment 1 has a higher thermal conductivity. This is due to the addition of liquid crystal polymer which can promote the dispersion and alignment of the carbon nanotube at a particular direction to increase the thermal conductivity of the thermal interface material.

Moreover, the composition of the thermal interface material of comparative example 1 has a higher thermal conductivity than those of the thermal interface material of comparative examples 2 and 3. In other words, using the carbon nanotube as the thermal conductive material is superior to metal of ceramic powders. In addition, using the same amount Further, the new type CNT-LC composite structure and the phase change thermoplastic resin are compatible and do not have phase separation. The phase change temperature (PCT) of the thermal interface material formed with the composition of the present invention is about 45 to 75° C. Therefore, under a normal operating condition, the void, hole and crack on the surface of the device can be filled to lower the thermal resistance of the device to about one tenth of the original thermal resistance. Accordingly, the deficiencies of a low thermal conductivity and a high thermal resistance in the existing thermal interface materials can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A composition of a thermal interface material comprising:
 a phase change thermoplastic resin, wherein a percentage of the phase change thermoplastic resin in the composition is about 30 to 89 by weight, wherein a melting point of the phase change thermoplastic resin is lower than 100° C.;
 a liquid crystal polymer, wherein a percentage of the liquid crystal polymer in the composition is about 10 to 50 by weight; and
 a carbon nanotube, wherein a percentage of the carbon nanotube in the composition is about 1 to 25 by weight.

2. The composition of claim 1, wherein the phase change thermoplastic resin is selected from the group consisting of ethylene vinyl acetate, ethylene-vinyl acetate copolymer, polyvinyl chloride, rosin ester, polyoxymethylene copolymers, polyolefin, polyamide, polycarbonate, polyester, ethylene vinyl acetate, polyvinylacetate, polyimide and a mixture thereof.

3. The composition of claim 1, wherein the phase change thermoplastic resin is an ethylene-vinyl acetate copolymer.

4. The composition of claim 3, wherein a melting index of the ethylene-vinyl acetate copolymer is about 2 to 100 g/10 min.

5. The composition of claim 3, wherein a percentage of vinyl acetate in the ethylene-vinyl acetate copolymer is about 30 to 50 by weight.

6. The composition of claim 1, wherein the liquid crystal polymer is nematic liquid crystal polymer, smectic liquid crystal polymer or cholesteric liquid crystal polymer.

7. The composition of claim 1, wherein a monomer of the liquid crystal polymer includes cholesterol benzoate.

8. The composition of claim 1, wherein the molecular weight of the liquid crystal polymer is about 3000 to 50000 g/mole.

9. The composition of claim 1, wherein the carbon nanotube is a single wall carbon nanotube or a multi wall carbon nanotube.

10. The composition of claim 1, wherein an average diameter of the carbon nanotube is about 1 to 100 nm.

11. The composition of claim 1, wherein an aspect (length/diameter) ratio of the carbon nanotube is about 5 to 10000.

12. The composition of claim 1 further comprising a solvent.

13. The composition of claim 12, wherein the solvent is toluene, xylene or methyl ethyl ketone.

14. The composition of claim 1, wherein the percentage of the phase change thermoplastic resin is about 30 to 84 by weight, the percentage of the liquid crystal polymer is about 15 to 50 by weight and the percentage of the carbon nanotube is about 1 to 20 by weight.

* * * * *